US009413248B2

(12) United States Patent
Huang (10) Patent No.: US 9,413,248 B2
(45) Date of Patent: Aug. 9, 2016

(54) CONTROL METHOD AND AC-DC POWER CONVERTER

(71) Applicant: Silergy Semiconductor Technology (Hangzhou) LTD, Hangzhou, ZheJiang Province (CN)

(72) Inventor: Xiaodong Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 3 days.

(21) Appl. No.: 14/483,042

(22) Filed: Sep. 10, 2014

(65) Prior Publication Data

US 2015/0085537 A1 Mar. 26, 2015

(30) Foreign Application Priority Data

Sep. 25, 2013 (CN) .......................... 2013 1 0446626

(51) Int. Cl.
| | |
|---|---|
| *H02M 3/335* | (2006.01) |
| *H02M 1/12* | (2006.01) |
| *H02M 1/42* | (2007.01) |
| H02M 7/06 | (2006.01) |
| H02M 7/155 | (2006.01) |
| H02M 1/00 | (2006.01) |

(52) U.S. Cl.
CPC ............ *H02M 3/33507* (2013.01); *H02M 1/12* (2013.01); *H02M 1/4258* (2013.01); *H02M 7/066* (2013.01); *H02M 7/1557* (2013.01); *H02M 2001/0032* (2013.01); *Y02B 70/126* (2013.01); *Y02B 70/16* (2013.01)

(58) Field of Classification Search
CPC ................. H02M 2001/0025; H02M 3/33507; H02M 2001/0032; H02M 7/1557; H02M 7/066
See application file for complete search history.

(56) References Cited

U.S. PATENT DOCUMENTS

| | | | | |
|---|---|---|---|---|
| 2009/0295445 | A1* | 12/2009 | Ouyang | .................... H03K 7/08 327/172 |
| 2010/0073967 | A1* | 3/2010 | Tatsukawa | ........ H02M 3/33507 363/21.18 |
| 2012/0250367 | A1* | 10/2012 | Desimone | ................ H02M 1/44 363/21.17 |
| 2013/0051098 | A1* | 2/2013 | Yang | ..................... H02M 3/335 363/95 |
| 2013/0100715 | A1* | 4/2013 | Lin | .................... H02M 3/33507 363/21.17 |
| 2013/0241461 | A1 | 9/2013 | Huang | |
| 2014/0021879 | A1 | 1/2014 | Yu et al. | |
| 2014/0062322 | A1 | 3/2014 | Yu et al. | |
| 2014/0252990 | A1* | 9/2014 | Maru | ................. H02M 3/33507 315/307 |
| 2014/0375286 | A1* | 12/2014 | Jiang | ..................... H02M 3/156 323/271 |

\* cited by examiner

*Primary Examiner* — Jue Zhang
*Assistant Examiner* — Lakaisha Jackson
(74) *Attorney, Agent, or Firm* — Michael C. Stephens, Jr.

(57) ABSTRACT

In one embodiment, a method of controlling an AC-DC power converter, can include: (i) receiving, by a filter capacitor, a first branch current from an input current of the AC-DC power converter; (ii) receiving, by a power converting circuit, a second branch current from the input current; (iii) receiving, by the power converting circuit, a feedback signal that represents an output signal of the power converting circuit, and a triangular wave signal that is determined by the first branch current; (iv) generating a first conduction time based on the feedback signal such that the power converting circuit produces a first converting current; and (v) generating a second conduction time based on the triangular wave signal such that the power converting circuit produces a second converting current having a same absolute value as the first branch current.

9 Claims, 9 Drawing Sheets

CONTROL METHOD AND AC-DC POWER CONVERTER

RELATED APPLICATIONS

This application claims the benefit of Chinese Patent Application No. 201310446626.0, filed on Sep. 25, 2013, which is incorporated herein by reference in its entirety.

FIELD OF THE INVENTION

The present invention relates to AC-DC power converters, and more particularly to a control method, a power converting circuit, and associated an AC-DC power converter.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. In this way, the output voltage and/or the output current of the switching power supply can be maintained as substantially constant. Therefore, the selection and design of the particular control circuitry and approach is very important to the overall performance of the switching power supply.

SUMMARY

In one embodiment, a method of controlling an AC-DC power converter, can include: (i) receiving, by a filter capacitor, a first branch current from an input current of the AC-DC power converter; (ii) receiving, by a power converting circuit, a second branch current from the input current; (iii) receiving, by the power converting circuit, a feedback signal that represents an output signal of the power converting circuit, and a triangular wave signal that is determined by the first branch current; (iv) generating a first conduction time based on the feedback signal such that the power converting circuit produces a first converting current; and (v) generating a second conduction time based on the triangular wave signal such that the power converting circuit produces a second converting current having a same absolute value as the first branch current, where the second branch current is sum of the first and second converting currents, and a power converting circuit conduction time is a sum of the first and second conduction times.

In one embodiment, an AC-DC power converter can include: (i) a filter capacitor configured to receive a first branch current from an input current of the AC-DC power converter; (ii) a power converting circuit configured to receive a second branch current from the input current; (iii) a compensating circuit configured to generate a first compensation signal by compensation of an error between a feedback signal that represents an output signal of the power converting circuit and a first reference voltage that represents a desired output value of the output signal; (iv) a superposition circuit configured to generate a second compensation signal by adding the first compensation signal with the triangular wave signal from a triangular wave signal generating circuit; (v) a driving control circuit configured to generate a control signal to control a power switching device of the power converting circuit based on the second compensation signal; and (vi) the power converting circuit being configured to produce a first converting current by a first conduction time that is generated based on the feedback signal, and a second converting current having a same absolute value as the first branch current by a second conduction time based on the triangular wave signal, where the second branch current is a sum of the first and second converting currents, and a power converting circuit conduction time is a sum of the first and second conduction times.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

An AC-DC power converter is a power supply that converts an AC input to a DC output, and this type of converter is wildly used in cell phone chargers, notebook adapters, etc., because of its relatively small volume and high efficiency. In all types of AC-DC power converters, a "flyback" AC-DC power converter is most common due to its relatively simple circuit structure and adjustable output voltage. A flyback converter may be used in both AC-DC and DC-DC conversion, with galvanic isolation between the input and any outputs. A flyback converter is essentially a buck-boost type of converter with the inductor split to form a transformer, such that the voltage ratios are multiplied, and with the additional advantage of isolation. In applications when driving a plasma lamp or a voltage multiplier, the rectifying diode of the boost converter can be left out and the resulting circuit may be considered a flyback transformer. Other applications include other power supplies and light-emitting diode (LED) drivers.

Figure 1:
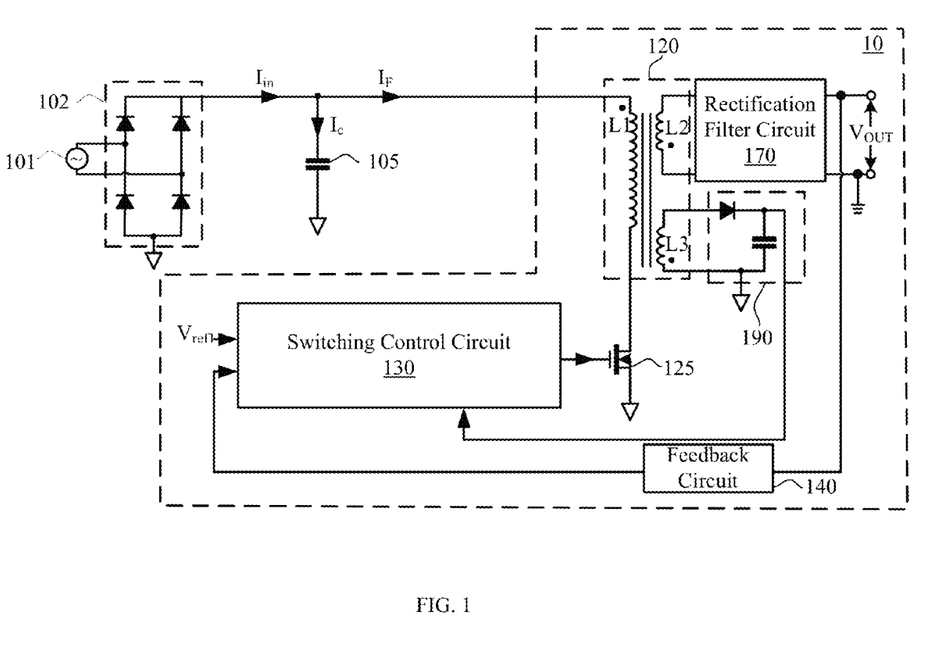
FIG. 1 is a schematic block diagram of an example AC-DC power converter.

Referring now to FIG. 1, shown is a schematic block diagram of an example AC-DC power converter. In this example AC-DC power converter, rectifier circuit 102 can rectify an AC input voltage of AC input power supply 101. Filter capacitor 105 can be coupled to rectifier circuit 102 to execute a filtering function, and to supply power to power converting circuit 10. Capacitor 105 can be coupled in parallel to power converting circuit 10, and thus input current $I_{in}$ of power converting circuit 10 can be divided into branch current $I_C$ and branch current $I_F$ by way of filter capacitor 105 and power converting circuit 10, respectively, where $I_{in}=I_C+I_F$.

For example, power converting circuit 10 can be a flyback type of power converter, and can include transformer 120 and power switching device (e.g., power transistor) 125. Transformer 120 can include primary winding L1, secondary winding L2, and auxiliary winding L3. Primary winding L1 can receive branch current $I_F$, and may induce the signal to secondary winding L2. Secondary winding L2 can transmit the induced voltage signal to rectification filter circuit 170, and may generate DC output $V_{OUT}$ after rectification and filtering. A feedback signal can be generated to switching control circuit 130 by processing DC output $V_{OUT}$ via feedback circuit 140. Switching control circuit 130 may also receive reference voltage $V_{ref1}$ that can represent a desired output value of DC output $V_{OUT}$, and can generate a control signal for controlling (e.g., turning on/off) power switching device 125. Also, bias voltage generating circuit 190 can generate a bias voltage signal for switching control circuit 130 based on an induced current of auxiliary winding L3.

Figure 2:
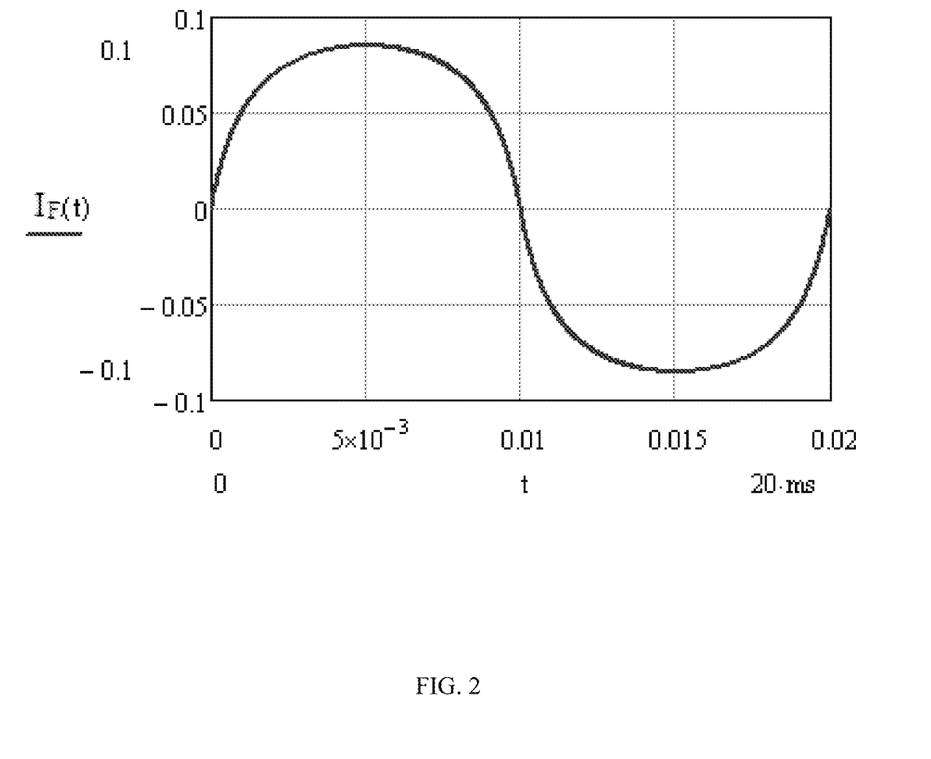
FIG. 2 is a waveform diagram of a first example branch current.
Figure 3:
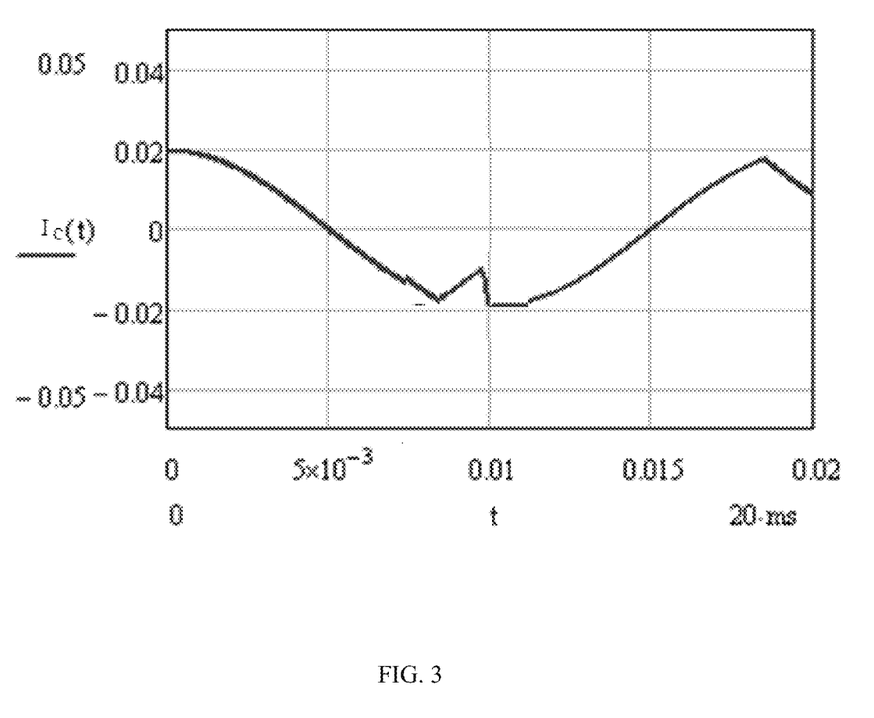
FIG. 3 is a waveform diagram of a second example branch current.
Figure 4:
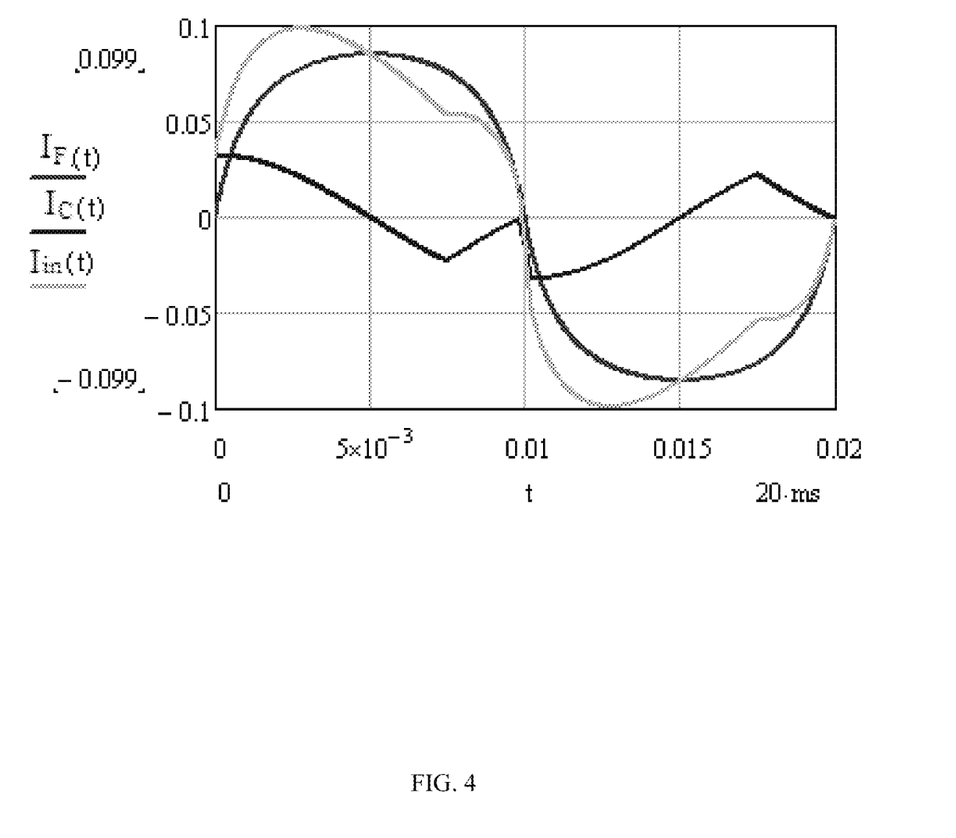
FIG. 4 is a waveform diagram of an example input current.

Referring now to FIG. 2, shown is a waveform diagram of an example branch current $I_F$. As shown, this branch current $I_F$ in the flyback power converter may be a sine wave, over a cycle (e.g., about 20 ms), where the ordinate indicates current (A), and the abscissa indicates time t (ms). Referring now to FIG. 3, shown is a waveform diagram of an example branch current $I_C$, also over a cycle (e.g., about 20 ms), where the ordinate also indicates current (A), and the abscissa also indicates time t (ms). Referring now to FIG. 4, shown is a waveform diagram of an example input current. As shown, the waveform of branch current $I_C$ may change suddenly due to the charging and discharging of filter capacitor 105. As a result, input current $I_{in}$ may not be a sine wave.

Particularly when the power converting circuit 10 has a relatively light load, branch current $I_C$ can occupy a relatively large portion of input current and thus may cause a larger effect on input current $I_{in}$. This can result in a relatively large harmonic on input current $I_{in}$, as well as a relatively low system power factor. In addition, a filter capacitor may cause harmonics on an input current in an AC-DC power converter in the prior art. Those skilled in the art will recognize that in an AC-DC power converter, such as a flyback power stage circuit, a quasi-resonance control mode can be applied to improve the power factor and to reduce power losses. In such a case, branch current $I_F$, i.e., a current of power converter 10 at time t can be as shown below in equation (1).

$$I_F = \frac{1}{2} \times \frac{V_{in}(t) \times t_{on} \times d(t)}{L_m} \tag{1}$$

Also, branch current $I_C$, i.e., a current of filter capacitor 105 at time t can be as shown below in equation (2).

$$I_C = \sqrt{2} \times 2\pi f \times C \times \sin[2\pi \times f \times (t+5)] \tag{2}$$

$V_{in}(t)$ can indicate a voltage of an AC input at time t, $t_{on}$ can indicate an on time of a power switching device, d(t) can indicate a duty cycle, $L_m$ can indicate a magnetizing inductance of a transformer, f can indicate a frequency of the AC input, and C can indicate a capacitance of the filter capacitor. In some AC-DC power converters, a harmonic on the input current can be caused by branch current $I_C$ of the filter capacitor can be substantially eliminated by generating a current (e.g., converting current $I_{F2}$) with a same value, but opposite direction (e.g., a same absolute value) as the branch current $I_C$. Based operation principles of flyback power converters, converting current $I_{F2}$ can be calculated as shown below in equation (3).

$$I_{F2} = \frac{1}{2} \times \frac{V_{in}(t) \times t'_{on} \times d(t)}{L_m} \tag{3}$$

Here, $t_{on}'$ can indicate another conduction time. If $I_{F2}=-I_C$, and equation (2) is put into equation (3), equation (4) as shown below can be obtained. As used herein, "conduction time" can be an on time or duration of a corresponding switch or circuit being in a conductive state. For example, a conduction time of a switch can be a duration over which that switch is conducting or on. Further, "time" can be a time duration (e.g., for a conduction or on time), or a given point in time (e.g., for an abscissa in a waveform diagram).

$$\frac{1}{2} \times \frac{V_{in}(t) \times t'_{on} \times d(t)}{L_m} = -\sqrt{2} \times 2\pi \times f \times C \times \sin[2\pi \times f \times (t+5)] \tag{4}$$

Equation (5) as shown below can be obtained from equation (4).

$$t'_{on} = -\frac{2A \times L_m \times \sin[2\pi \times f \times (t+5)]}{V_{in}(t) \times d(t)} \tag{5}$$

A function with time t can be derived to obtain equation (6), as shown below, where A and B are coefficients.

$$t'_{on} = -\frac{2B \times L_m \times \cos[2\pi \times f \times (t+5)]}{V_{in}(t)} \tag{6}$$

In one embodiment, an AC-DC power converter can include: (i) a filter capacitor configured to receive a first branch current from an input current of the AC-DC power converter; (ii) a power converting circuit configured to receive a second branch current from the input current; (iii) a compensating circuit configured to generate a first compensation signal by compensation of an error between a feedback signal that represents an output signal of the power converting circuit and a first reference voltage that represents a desired output value of the output signal; (iv) a superposition circuit configured to generate a second compensation signal by adding the first compensation signal with the triangular wave signal from a triangular wave signal generating circuit; (v) a driving control circuit configured to generate a control signal to control a power switching device of the power converting circuit based on the second compensation signal; and (vi) the power converting circuit being configured to produce a first converting current by a first conduction time that can be generated based on the feedback signal, and a second converting current having a same absolute value as the first branch current by a second conduction time based on the triangular wave signal, where the second branch current can include a sum of the first and second converting currents, and a power converting circuit conduction time can include a sum of the first and second conduction times.

Figure 5:
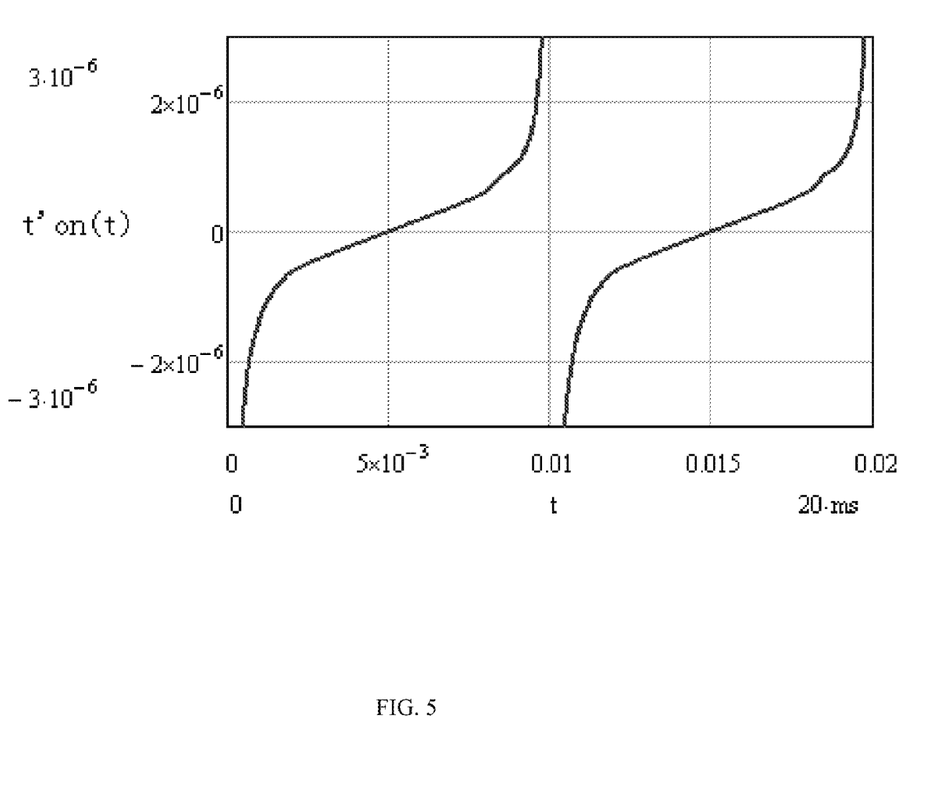
FIG. 5 illustrates a function diagram of a conduction time, in accordance with embodiments of the present invention.
Figure 6:
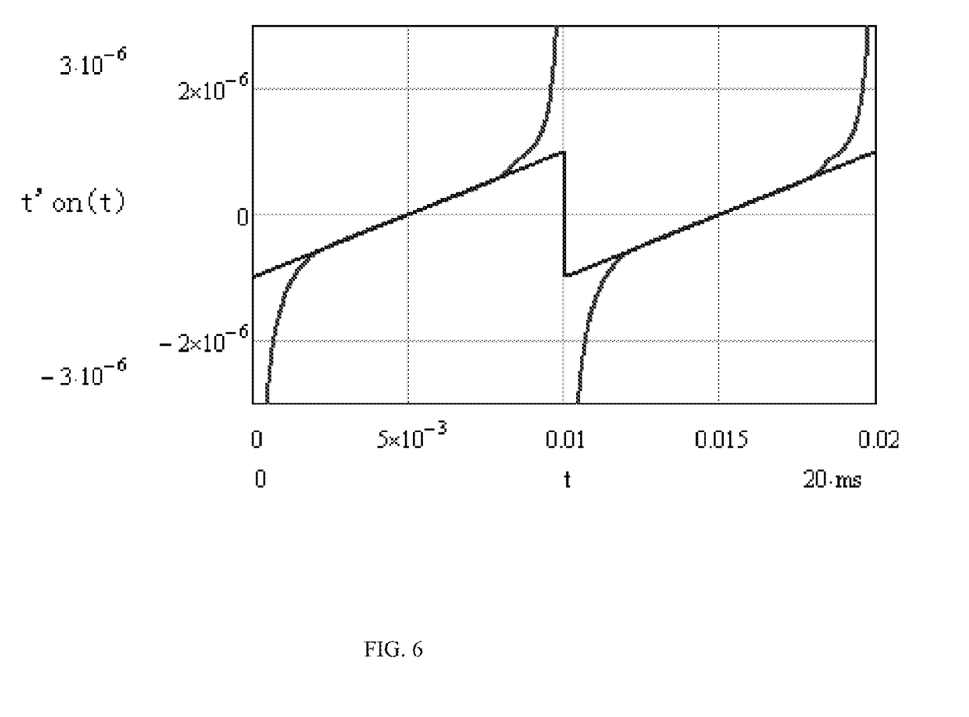
FIG. 6 illustrates a diagram of a desired signal indicative of a triangular wave signal, in accordance with embodiments of the present invention.

Referring now to FIG. 5, shown is a function diagram of a conduction time, in accordance with embodiments of the present invention. From equation (6), conduction time $t_{on}'$ can be a cotangent function, where the ordinate can indicate current (A), the abscissa can indicate time t (ms), and the waveform over one cycle (e.g., about 20 ms) is shown. Referring now to FIG. 6, shown is a diagram of a desired signal indicative of a triangular wave signal, in accordance with embodiments of the present invention. Because it may be difficult to realize a cotangent function, conduction time $t_{on}'$ can be fit to obtain a linear expression, such as a desired signal that represents a triangular wave signal, as shown in FIG. 6 with a waveform diagram in one cycle (e.g., about 20 ms), where the ordinate can also indicate current (A), and the abscissa can also indicate time t (ms).

In particular embodiments, a corresponding triangular wave signal can be generated to control an on (or conduction) time (duration) of the power switching device (e.g., 125) one with respect to the desired signal. The power switching device can generate conduction time $t_{on}'$ such that the power converting circuit produces a converting current with a same value but opposite direction as branch current $I_C$ of the filter capacitor. In this way, effects of branch current $I_C$ and harmonic(s) on input current $I_{in}$ can be substantially eliminated, resulting in improved power factor, or power factor correction (PFC).

Also in particular embodiments, an error between the feedback signal and a reference voltage (e.g., $V_{ref1}$) can be determined and compensated to obtain a first compensation signal. For example, where reference voltage $V_{ref1}$ can be (or otherwise represent) a desired output value of the output signal (e.g., $V_{OUT}$) of the power converting circuit. Also, the first compensation signal can be added with the triangular wave signal to generate a second compensation signal. Further, a control signal can be generated based on the second compensation signal, and this may be used to control the power switching device (e.g., 125) of the power converting circuit.

In this approach, only the triangular wave signal can be added in for regulating an on time of the power switching device. This can substantially eliminate effects on the input current due to branch current $I_C$, as well as harmonic(s) or other noise effects on the input current (e.g., $I_{in}$) that may be caused by filter capacitor 105. Particular embodiments also include a power converting circuit that can utilize such control. As will be discussed in more detail below, a compensating circuit can include a triangular wave signal generating circuit, a superposition circuit, and a driving control circuit. Also in particular embodiments, an AC-DC power converter can utilise control methods as described herein, and may include a filter capacitor and a power converting circuit (e.g., a flyback converter) coupled in parallel to the filter capacitor.

Figure 7:
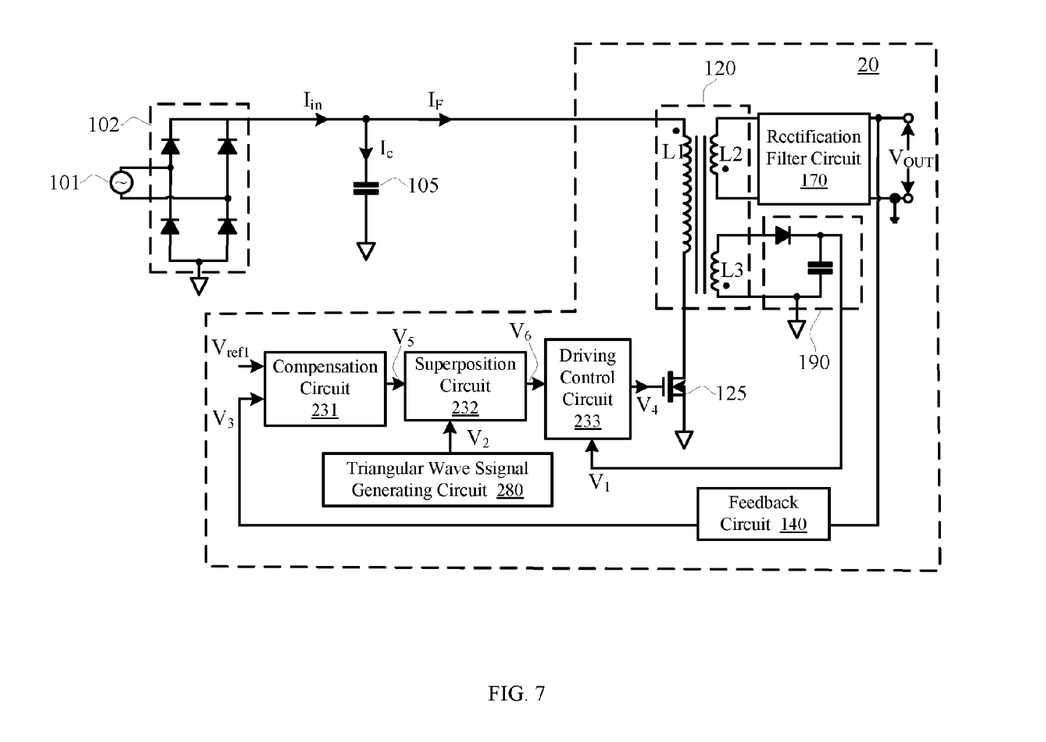
FIG. 7 is a schematic block diagram of an example AC-DC power converter, in accordance with embodiments of the present invention.

Referring now to FIG. 7, shown is a schematic block diagram of an example AC-DC power converter, in accordance with embodiments of the present invention. The example AC-DC power converter can convert an AC input to a DC output (e.g., $V_{OUT}$), and can include power converting circuit 20 and filter capacitor 105 coupled in parallel to power converting circuit 20. The AC-DC power converter further can include rectifier circuit 102 for rectifying the AC input generated by AC input power supply 101. Input current $I_{in}$ can be divided into branch currents $I_C$ and $I_F$ by filter capacitor 105 and power converting circuit 20. Branch current $I_C$ can be the current of filter capacitor 105, and branch current $I_F$ can be the current of power converting circuit 20, and $I_{in}=I_C+I_F$. In this particular example, power converting circuit 20 can include compensating circuit 231, triangular wave signal generating circuit 280, superposition circuit 232, and driving control circuit 233.

Compensation circuit 231 can determine an error between feedback signal $V_3$, which can be indicative of the output signal of power converting circuit 20, and reference voltage $V_{ref1}$. Compensation circuit 231 can generate compensation signal $V_5$ by compensating the error, where compensation signal $V_5$ can be substantially constant. Feedback signal $V_3$ in this example can be obtained by sampling output voltage $V_{OUT}$, or can otherwise be obtained by sampling an output current signal. Also, reference voltage $V_{ref1}$ can represent a desired voltage value indicative of the output signal of power converting circuit 20.

Figure 8:
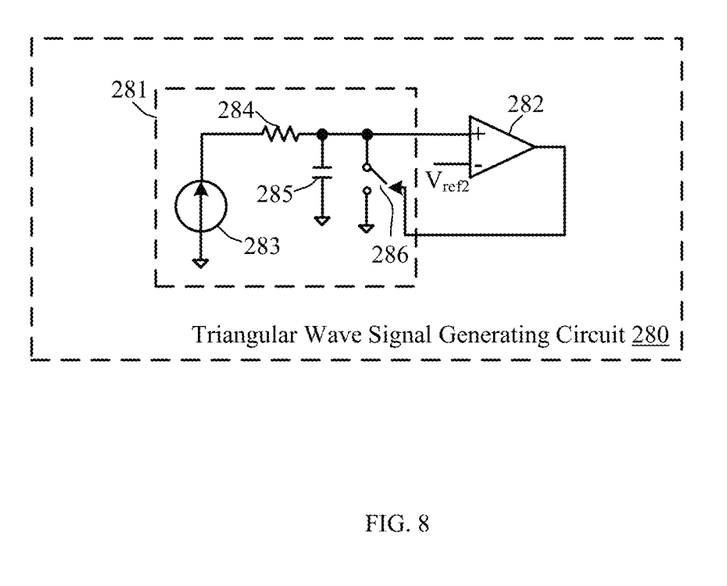
FIG. 8 is a schematic block diagram of an example triangular wave signal generating circuit, in accordance with embodiments of the present invention.

Referring now to FIG. 8, shown is a schematic block diagram of an example triangular wave signal generating circuit, in accordance with embodiments of the present invention. Triangular wave signal generating circuit 280 can generate triangular wave signal $V_2$. For example, triangular wave signal generating circuit 280 can include charging and discharging circuit 281 and comparator 282. Charging and discharging circuit 281 can include DC power supply 283, capacitor 285, and switch (e.g., transistor) 286. Capacitor 285 can be coupled in parallel to switch 286, and in series with DC power supply 283. DC power supply 283 can charge capacitor 285. In this example, resistor 284 is coupled between DC power supply 283 and capacitor 285 to regulate the charging current, and to control the voltage across capacitor 285. Comparator 282 can generate a signal for controlling switch 286, to control the discharging of capacitor 285.

Comparator 282 can receive a voltage across capacitor 285, and reference voltage $V_{ref2}$, and may output a comparison signal. For example, the voltage across capacitor 285 can be configured as triangular wave signal $V_2$. However, any suitable triangular wave signal generating circuit can be employed in particular embodiments. In any event, the amplitude of the desired signal can be substantially constant during generation of the desired signal that is indicative of triangular wave signal $V_2$. Also, values of DC power supply 238, capacitor 285, and/or reference voltage $V_{ref2}$ can be determined by the amplitude of the desired signal, and may be set according to a particular application.

Superposition circuit 232 (e.g., and adder circuit) can add compensation signal $V_5$ with triangular wave signal $V_2$, to generate compensation signal $V_6$. Driving control circuit 233 can receive compensation signal $V_6$, and may generate control signal $V_4$ to control power switching device 125 of power converting circuit 20. Conduction time $t_{on1}$ can be generated according to feedback signal $V_3$ in a switching cycle of power switching device 125, such that power converting circuit 20 produces converting current $I_{F1}$. Conduction time $t_{on}'$ can be generated according to triangular wave signal $V_2$ such that power converting circuit 20 produces converting current $I_{F2}$. Also, converting current $I_{F2}$ can be configured to offset branch current $I_C$.

Conduction time $t_{on}$ of power converting circuit 20 can be a sum of conduction time $t_{on1}$ and conduction time $t_{on}'$ ($t_{on}=t_{on1}+t_{on}'$), and branch current $I_F$ can be a sum of converting currents $I_{F1}$ and $I_{F2}$ ($I_F=I_{F1}+I_{F2}$). In the particular implementation of the above circuit, converting current $I_{F1}$ can be calculated as shown below in equation (7).

$$I_{F1} = \frac{1}{2} \times \frac{V_{in}(t) \times t_{on1} \times d(t)}{L_m} \quad (7)$$

As triangular wave signal $V_2$ can be obtained by fitting the function of conduction time $t_{on}{}'$, conduction time $t_{on}{}'$ generated by controlling power switching device 125 via triangular wave signal $V_2$ can be as shown below in equation (8).

$$t'_{on} = -\frac{2B \times L_m \times \cos[2\pi \times f \times (t+5)]}{V_{in}(t)} \quad (8)$$

Here, B can be a coefficient, $L_m$ can be the magnetizing inductance of transformer 120, f can be the frequency of the AC input, and $V_{in}(t)$ can be a voltage of the AC input at time t. When conduction time $t_{on}{}'$ meets the above-described requirements, converting current $I_{F2}$ can be: $I_{F2}=-I_C$, because $I_F=I_{F1}+I_{F2}$, and $I_{in}=I_C+I_F$, $I_{in}=I_C+I_{F1}+I_{F2}=I_{F1}$. Therefore, conduction time $t_{on}{}'$ can make converting current $I_{F2}$ offset branch current $I_C$, and input current $I_{in}$ can be a sine wave with a same or similar waveform as converting current $I_{F1}$. In this way, harmonic effects on the input current due to the filter capacitor can be substantially eliminated or reduced.

In addition, rectification filter circuit 170 in FIG. 7 can be coupled between secondary winding L2 of transformer 120 and DC output $V_{OUT}$. Secondary winding L2 can transmit the induced voltage signal to rectification filter circuit 170, and DC output $V_{OUT}$ can be generated after rectifying and filtering. The feedback signal can be generated by processing DC output $V_{OUT}$ via feedback circuit 140, and may be provided to compensating circuit 231. Also, bias voltage generating circuit 190 provides bias voltage signal $V_1$ to driving control circuit 233.

In one embodiment, a method of controlling an AC-DC power converter, can include: (i) receiving, by a filter capacitor, a first branch current from an input current of the AC-DC power converter; (ii) receiving, by a power converting circuit, a second branch current from the input current; (iii) receiving, by the power converting circuit, a feedback signal that represents an output signal of the power converting circuit, and a triangular wave signal that is determined by the first branch current; (iv) generating a first conduction time based on the feedback signal such that the power converting circuit produces a first converting current; and (v) generating a second conduction time based on the triangular wave signal such that the power converting circuit produces a second converting current having a same absolute value as the first branch current, where the second branch current can include a sum of the first and second converting currents, and a power converting circuit conduction time can include a sum of the first and second conduction times.

Figure 9:
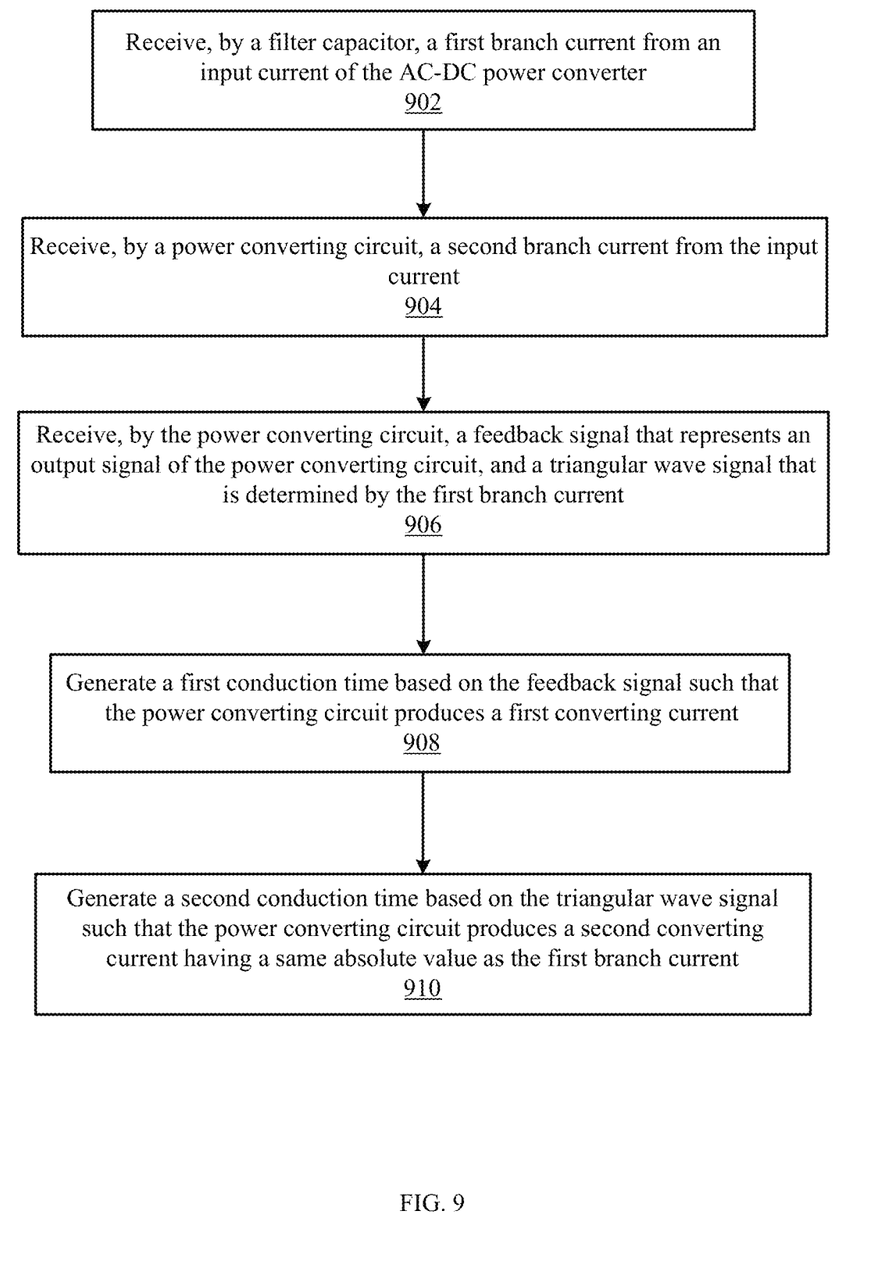
FIG. 9 is a flow diagram of an example method of controlling an AC-DC power converter, in accordance with embodiments of the present invention.

Referring now to FIG. 9, shown is a flow diagram of an example method of controlling an AC-DC power converter, in accordance with embodiments of the present invention. At 902, a first branch current (e.g., TO can be received by a filter capacitor (e.g., 105) from an input current (e.g., $I_{in}$) of the AC-DC power converter. At 904, a second branch current (e.g., $I_F$) can be received by a power converting circuit (e.g., 20) from the input current. At 906, a feedback signal (e.g., $V_3$) that represents an output signal of the power converting circuit, and a triangular wave signal (e.g., $V_2$) that is determined by the first branch current, can be received.

At 908, a first conduction time (e.g., $t_{on}$) can be generated based on the feedback signal such that the power converting circuit produces a first converting current (e.g., $I_{F1}$). At 910, a second conduction time (e.g., $t_{on}{}'$) can be generated based on the triangular wave signal such that the power converting circuit produces a second converting current (e.g., $I_{F2}$) having a same absolute value as the first branch current. Also, the second branch current (e.g., $I_F$) can include a sum of the first and second converting currents (e.g., $I_F=I_{F1}+I_{F2}$). In addition, a power converting circuit conduction time (e.g., the on time of power transistor 125) can include a sum of the first and second conduction times (e.g., $t_{on}+t_{on}{}'$). In this way, the input current can be a sine wave like the first converting current, so as to reduce or eliminate harmonic effect(s) on the input current due to the filter capacitor.

While mostly analog circuitry has been described herein to implement various aspects of particular embodiments, digital circuits and/or regulation approaches can also be employed to realize signal regulation in certain embodiments. In addition, the flyback power stage circuit described herein can operate in a quasi-resonance control mode, a current control mode, and/or a voltage control mode. Finally, any suitable power converting or power stage circuit topology (e.g., buck, boost, buck-boost, SEPIC, Zeta, etc.) can be employed in particular embodiments.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling an AC-DC power converter, the method comprising:
    a) receiving, by a filter capacitor, a first branch current from an input current of said AC-DC power converter;
    b) receiving, by a power converting circuit, a second branch current from said input current;
    c) receiving, by said power converting circuit, a feedback signal that represents an output signal of said power converting circuit, and a triangular wave signal that is determined by said first branch current;
    d) generating a first conduction time based on said feedback signal such that said power converting circuit produces a first converting current; and
    e) generating a second conduction time based on said triangular wave signal such that said power converting circuit produces a second converting current having a same absolute value as said first branch current, wherein said second branch current comprises a sum of said first and second converting currents, and a power converting circuit conduction time comprises a sum of said first and second conduction times.

2. The control method of claim 1, further comprising:
    a) generating a first compensation signal by determining and compensating an error between said feedback signal and a first reference voltage, wherein said first reference voltage represents a desired output value of said power converting circuit;
    b) generating a second compensation signal by adding said first compensation signal and said triangular wave signal; and
    c) generating a control signal to control a power switching device of said power converting circuit based on said second compensation signal.

3. The method of claim 1, further comprising:
a) obtaining a function of said second conduction time based on a calculation formula of said first branch current and said first converting current;
b) obtaining a desired signal indicative of said triangular wave signal by curve fitting said function of said second conduction time; and
c) generating said triangular wave signal according to said desired signal.

4. An AC-DC power converter, comprising:
a) a filter capacitor configured to receive a first branch current from an input current of said AC-DC power converter;
b) a power converting circuit configured to receive a second branch current from said input current;
c) a compensating circuit configured to generate a first compensation signal by compensation of an error between a feedback signal that represents an output signal of said power converting circuit and a first reference voltage that represents a desired output value of said output signal;
d) a superposition circuit configured to generate a second compensation signal by adding said first compensation signal with a triangular wave signal from a triangular wave signal generating circuit;
e) a driving control circuit configured to generate a control signal to control a power switching device of said power converting circuit based on said second compensation signal; and
f) said power converting circuit being configured to produce a first converting current by a first conduction time that is generated based on said feedback signal, and a second converting current having a same absolute value as said first branch current by a second conduction time based on said triangular wave signal, wherein said second branch current comprises a sum of said first and second converting currents, and a power converting circuit conduction time comprises a sum of said first and second conduction times.

5. The AC-DC power converter of claim 4, wherein:
a) a function of said second conduction time is obtained based on a calculation formula of said first branch current and said first converting current;
b) a desired signal indicative of said triangular wave signal is obtained by curve fitting said function of said second conduction time; and
c) said triangular wave signal is generated based on said desired signal.

6. The AC-DC power converter of claim 5, wherein said triangular wave signal generating circuit comprises:
a) a charging and discharging circuit having a DC power supply, a capacitor coupled in parallel to a switch, and in series with said DC power supply, wherein said DC power supply is configured to charge said capacitor;
b) a comparator configured to receive a voltage across said capacitor that is configured as said triangular wave signal, and a second reference voltage, and to generate a comparison signal; and
c) wherein values of said DC power supply, said capacitor, and said second reference voltage are determined by said desired signal.

7. The AC-DC power converter of claim 4, wherein said superposition circuit comprises an adder.

8. The AC-DC power converter of claim 4, wherein said power converting circuit is coupled in parallel to said filter capacitor.

9. The AC-DC power converter of claim 4, further comprising a rectifier circuit configured to generate a DC input to said power converting circuit.

* * * * *